United States Patent Office 3,185,634
Patented May 25, 1965

3,185,634
OIL RECOVERY BY FOAM DRIVE
Forrest F. Craig, Jr., and James L. Lummus, Tulsa, Okla., assignors to Pan American Petroleum Corporation, Tulsa, Okla., a corporation of Delaware
No Drawing. Filed July 14, 1961, Ser. No. 123,998
4 Claims. (Cl. 166—9)

This invention relates to a method for recovering oil from petroleum deposits by injecting a foam into an oil-bearing formation to drive the oil to one or more wells where it may be recovered.

The various drive processes which have been used to sweep oil from underground formations have not met with unqualified success. The two principal reasons behind such unreliable performances are, first, some portions of the formations are bypassed and not contacted by the driving fluid. The second reason is that the driving fluid is unable to overcome the forces holding the oil in the pores of the formation and move the oil toward the output well. Gas drive and waterflood processes generally sweep a large portion of the formation; however, considerable oil is left behind. When the formation is swept with a miscible fluid such as L.P.G., i.e., a propane-butane mixture, substantially all of the oil is displaced from that portion of the formation which is contacted by the fluid, however sweep efficiency is generally poor. It is not practical from an economic standpoint to drive with L.P.G. alone. Therefore, a gas miscible with the L.P.G. is usually injected following the establishment of a bank of L.P.G. in the formation adjacent the injection well. The mobility of the gas, i.e., the permeability of the formation to the gas divided by the viscosity of the gas, is quite high in comparison to the mobility of the L.P.G. Owing to this high mobility ratio, a low sweep efficiency may be experienced. Some efforts have been made to overcome this difficulty by injecting the gas and a liquid, typically water, following the solvent bank simultaneously as well as sequentially. This system has met with varying degrees of success. A major problem has been in getting uniform injection. Apparently, the two fields segregate in the injection well with the result that gas is injected high and liquid is injected low in the formation.

Although the system of water driving gas presents a highly favorable mobility ratio, it is not a practical system for the reason that trapping of the gas by the water soon depletes the gas zone. The use of a larger gas zone to allow for the loss due to trapping departs from the preferred process and approaches that of an ordinary gas drive.

It is, therefore, an object of our invention to increase the amount of oil recovered from a formation by a drive process. Another object is to improve the mobility ratio between the driving fluid and the driven fluid in a recovery process. A further object is to achieve uniform simultaneous injection of a gas and a liquid. These and other objects will be apparent from the following description of our invention.

The formation containing the oil to be recovered by our novel process has one or more injection and production wells. These wells may be arranged for a line drive or may be in the common five-spot pattern. In the preferred form of our invention we first inject a quantity of a fluid miscible with the reservoir oil equal to about 0.1 to 10 percent of the pore volume of the formation to be swept. Following this step, we may inject a quantity of gas equal to from 50 to 100 percent of the solvent volume. Next we inject a foam prepared by passing a stream of gas through a solution of a foaming agent. Foam injection should be continued until a quantity equal to at least 20 percent of the pore volume of the formation to be swept has been injected. Foam injection may be continued for the remainder of the drive process, however it is generally desirable to complete the drive by injecting water. Although numerous solvents or miscible fluids may be used, L.P.G. is probably the most desirable owing to its availability. Natural gas is preferred for the step following the solvent injection, however; we may use other gases such as nitrogen, hydrogen, and the carbon oxides, as well as mixtures of them with hydrocarbon gases.

The low mobility of the foam compared to gas alone presents a favorable mobility ratio at the interface between the gas and the foam. When the foam is driven by water, the mobility ratio between the foam and water is somewhat less favorable than in the case of gas driven by water, however there is little loss of sweep efficiency in switching to water as the final driving fluid. Thus, in our process, when foam is injected between the gas and water, we retain the favorable sweep efficiency of the system with water driving the gas and avoid the trapping of gas. This is obtained with only a slight change in mobility ratio.

The foam used in this process may be generated by passing the gas through a perforated body immersed in a solution of a foaming agent. The gas is desirably compressed before it enters the foam generator. In this manner the foam can be displaced directly from the generator to the injection well. Another method which can be used is to conduct the solution of foaming agent to a generator down the well. Compressed gas piped to the generator would produce the foam in the well and displace it into the formation. This method would not require the transport of foam down the well, however it would have the disadvantage that the foam generator would be more difficult to service at the bottom of the well.

Although our invention has been described above as it would be applied to the miscible fluid displacement process, it is by no means limited to that application. It may be used to advantage in other secondary recovery processes such as water flooding and gas drive. A bank of foam between the oil and flooding water increases the recovery of oil, possibly owing to reduced interfacial tension between the foam and oil. In gas drive, the foam bank provides a more favorable mobility ratio with the oil.

Water-soluble foaming agents are used to produce the foams for our recovery process. Our experiments have shown that as little as a trace of foaming agent, i.e., about 0.01 weight percent, in water produces a foam which is useful in our process. As much as 5.0 weight percent of the foaming agent may be used, however we prefer to use between about 0.1 and 3.0 weight percent. The optimum concentration of foaming agent is influenced by a number of factors such as the desired density, viscosity and bubble size of the foam. Also, emulsion problems in the produced fluids might be experienced at higher concentrations of foaming agent. Although any of a number of gases may be used such as air, nitrogen, carbon dioxide, methane, and the like, the physical properties of the foam are influenced somewhat by the composition of the gas.

Numerous commercially-available foaming agents have been tested and found to be satisfactory. Those tested included the following: modified sodium lauryl sulfate, sodium dioctylsulfosuccinate, mixed sodium lignin sulfonates, a complex fatty acid derivative of an aliphatic sulfonate, polyoxyethylene esters of mixed fatty and resin acids, dicocodimethyl ammonium chloride, and a coconut oil fatty acid amide.

The highest density foam which can be used in our process is one containing about one volume of liquid per three volumes of foam. Foams having a greater density are unstable, in that liquid drains from the walls of the bubbles producing a liquid layer under the foam. Gelling agents can be used to prepare stable foams having a higher liquid content, however these foams require a greater pressure drop to move them through the formation.

In addition to measuring the displacement efficiency of foaming agents, we evaluated methods for generating the foam. The results of this work show the foam must be generated before it is injected into the formation to obtain the greatest possible oil recovery. The results of this work are listed in the following tables.

TABLE I (UNCONSOLIDATED CORE)

| Driving fluid: | Vol. percent oil recovered |
|---|---|
| Water | 43 |
| 1% aqueous solution of sodium dioctylsulfosuccinate, driven by air | 55 |
| Foam (sodium dioctylsulfosuccinate) | 95 |

TABLE II (NELLIE BLY CORE)

| Driving fluid: | Vol. percent oil recovered |
|---|---|
| Water | 31 |
| 1% aqueous solution of sodium dioctylsulfosuccinate, driven by air | 37 |
| Foam (sodium dioctylsulfosuccinate) | 59 |
| 1% aqueous solution of modified sodium lauryl sulfate driven by air | 41 |
| Foam (modified sodium lauryl sulfate) | 58 |

The unconsolidated core used in the tests reported in Table I was prepared by filling a glass tube 30 cm. long and 1.25 cm. in diameter with 50–70 mesh sand. The core had a pore volume of 16 cc. and a permeability of about 8 darcys.

The sand-packed core was first evacuated, then saturated by drawing air-free distilled water into the core. Two pore volumes of a 50–50 mixture of Stoddard solvent and white oil were passed through the sand pack. The volume of water displaced was assumed to be equal to the volume of oil retained in the core. An initial gas saturation was obtained by passing 100 cc. of air through the core. A standard or reference value for recoverable oil was obtained by injecting 1 cc. of water, then driving with 400 cc. of air. This gave the 43 percent value listed in Table I.

The foaming agents were tested first to see whether total recovery is increased when foam is generated within the core by injecting 1 cc. of a 1 percent aqueous solution of the agent, then driving the solution with 400 cc. of air. The volume of oil displaced was then measured.

Foam was generated externally by passing air through a fritted glass pencil immersed in a one percent solution of the foaming agent. The foam was displaced from the generator into a sand core which had been packed with clean sand then saturated with water, oil and air, as in the previously described test.

The results of these tests demonstrated the advantage to be gained in using a foaming agent in a drive process. The great improvement when an externally-generated foam is injected rather than a solution of a foaming agent followed by a gas, illustrates the distinction between the two processes. The fact that a greater percentage of the oil was recovered with solution injection than with simple water injection suggests the solution may have performed as a surfactant or detergent in displacing the oil. There was little indication that there was substantial foam production within the cores.

Table II presents results of similar tests using consolidated Nellie Bly sandstone cores, rather than the unconsolidated sand core. These cores were about ¾ inch in diameter and from 3 to 4 inches long. Separate cores were used for each measurement. The volumes of liquids and air used were approximately the same proportion of pore volume as those used in the unconsolidated cores. The permeability of these cores was about 1.0 darcy. Referring to Table II, it will be seen that a solution of a foaming agent was more effective than water in displacing oil from these cores, however, the externally generated foams produced substantially greater oil recoveries than those obtained by attempts to generate the foam within the core.

From the results of the above tests it can be seen that foam can be used to increase oil recovery in a drive process. It is further apparent that the foam cannot be generated satisfactorily in the formation and must be generated prior to injection.

While we have described our invention with respect to specific oil recovery processes, other methods for applying it to the recovery of oil should be obvious to those skilled in the art. For example, it may be desirable in some operations to inject alternate quantities of foam and a driving fluid, such as gas or water. Therefore, our invention should be construed according to the following claims.

We claim:
1. A method of recovering oil from a formation having an input well and an output well, comprising; passing a gas through a permeable body immersed in a solution containing a foaming agent to generate a stable foam, injecting said foam into said input well and displacing said foam from said input well into said formation, and recovering oil from said output well while continuing the displacement of said foam through said formation.

2. The method according to claim 1 wherein said solution comprises an aqueous solution containing from about 0.01 to about 5.0 percent of a water-soluble foaming agent.

3. A method of recovering oil from a formation having an input well and an output well, comprising; injecting a solvent miscible with said oil, the volume of said solvent being between about 0.1 and 10 percent of the pore volume of the formation, then injecting a quantity of a gas equal to about 50 to 100 percent of the volume of said solvent, followed by injection of an aqueous foam having a volume equal to at least 20 percent of the pore volume of the formation, and thereafter driving said solvent, gas and foam through said formation by means of a driving fluid and recovering oil from said output well.

4. A method of recovering oil from a formation having an input and an output well comprising injecting a quantity of a gas corresponding to about 0.05 to 10 percent of the pore volume of the formation, followed by injecting into said formation at said input well a preformed stable foam having a volume equal to at least 20 percent of the pore volume of said formation, and thereafter driving said gas and foam through said formation by means of a driving fluid, and recovering oil from said output well.

References Cited by the Examiner

UNITED STATES PATENTS 2,866,507   12/58   Bond et al. _____ 166—9
2,968,350   1/61    Slobod et al. _____ 166—9

CHARLES E. O'CONNELL, Primary Examiner.

BENJAMIN BENDETT, HARRISON R. MOSELEY, BENJAMIN HERSH, Examiners.